United States Patent
Rajendran et al.

(10) Patent No.: US 11,166,061 B2
(45) Date of Patent: Nov. 2, 2021

(54) SYSTEM AND METHOD FOR DYNAMIC GENERATION OF PERSONALIZED VIDEO CONTENT THROUGH A BROWSER EMBEDDED VIDEO PLAYER

(71) Applicant: Infosys Limited, Bangalore (IN)

(72) Inventors: Pradeepraj Rajendran, Tiruvannamalai (IN); Reshma Thomas, Chennai (IN); Sowbarnika Sivasankaran, Chennai (IN); Sunil Gupta, Ambala (IN); Guruprasad Nellitheertha Venkataraja, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 134 days.

(21) Appl. No.: 16/809,295

(22) Filed: Mar. 4, 2020

(65) Prior Publication Data

US 2021/0185378 A1    Jun. 17, 2021

(51) Int. Cl.
| | |
|---|---|
| *H04N 21/2668* | (2011.01) |
| *H04N 21/458* | (2011.01) |
| *G06F 16/735* | (2019.01) |
| *H04N 21/84* | (2011.01) |
| *G06F 16/787* | (2019.01) |
| *H04N 21/235* | (2011.01) |
| *G06F 16/738* | (2019.01) |

(52) U.S. Cl.
CPC ....... *H04N 21/2668* (2013.01); *G06F 16/735* (2019.01); *G06F 16/738* (2019.01); *G06F 16/787* (2019.01); *H04N 21/2353* (2013.01); *H04N 21/458* (2013.01); *H04N 21/84* (2013.01)

(58) Field of Classification Search
None
See application file for complete search history.

(56) References Cited

U.S. PATENT DOCUMENTS

| | | |
|---|---|---|
| 2013/0325671 A1 | 12/2013 | Glass et al. |
| 2018/0376178 A1 | 12/2018 | Cormican |

OTHER PUBLICATIONS

Hjelsvold, Rune et al., "Web-based Personalization and Management of Interactive Video", ACM, Apr. 1, 2001, pp. 129-139.
European Search Report for corresponding EP Application No. EP 20199166.8, dated Mar. 12, 2021.

*Primary Examiner* — Justin E Shepard
(74) *Attorney, Agent, or Firm* — Troutman Pepper Hamilton Sanders LLP

(57) ABSTRACT

Disclosed are a system, method and apparatus for dynamically generating a personalized video content at run time, through a browser embedded video player is disclosed. A video configuration metadata file and a template video comprising one or more replaceable placeholders are received at a client device. User data id extracted from at least one user data source. The user data is validated based on a set of personalization parameters extracted from the user data source. The extracted user data is appended in the video configuration metadata file to generate an updated video configuration metadata file. The updated video configuration metadata file is parsed to generate one or more of overlay elements. The one or more placeholders are populated with corresponding one or more overlay elements. The overlay element is automatically arranging over the template video based on a set of predetermined rules and the personalized video content is presented.

20 Claims, 7 Drawing Sheets

Template Video    Video Configuration Metadata    Personalized video content

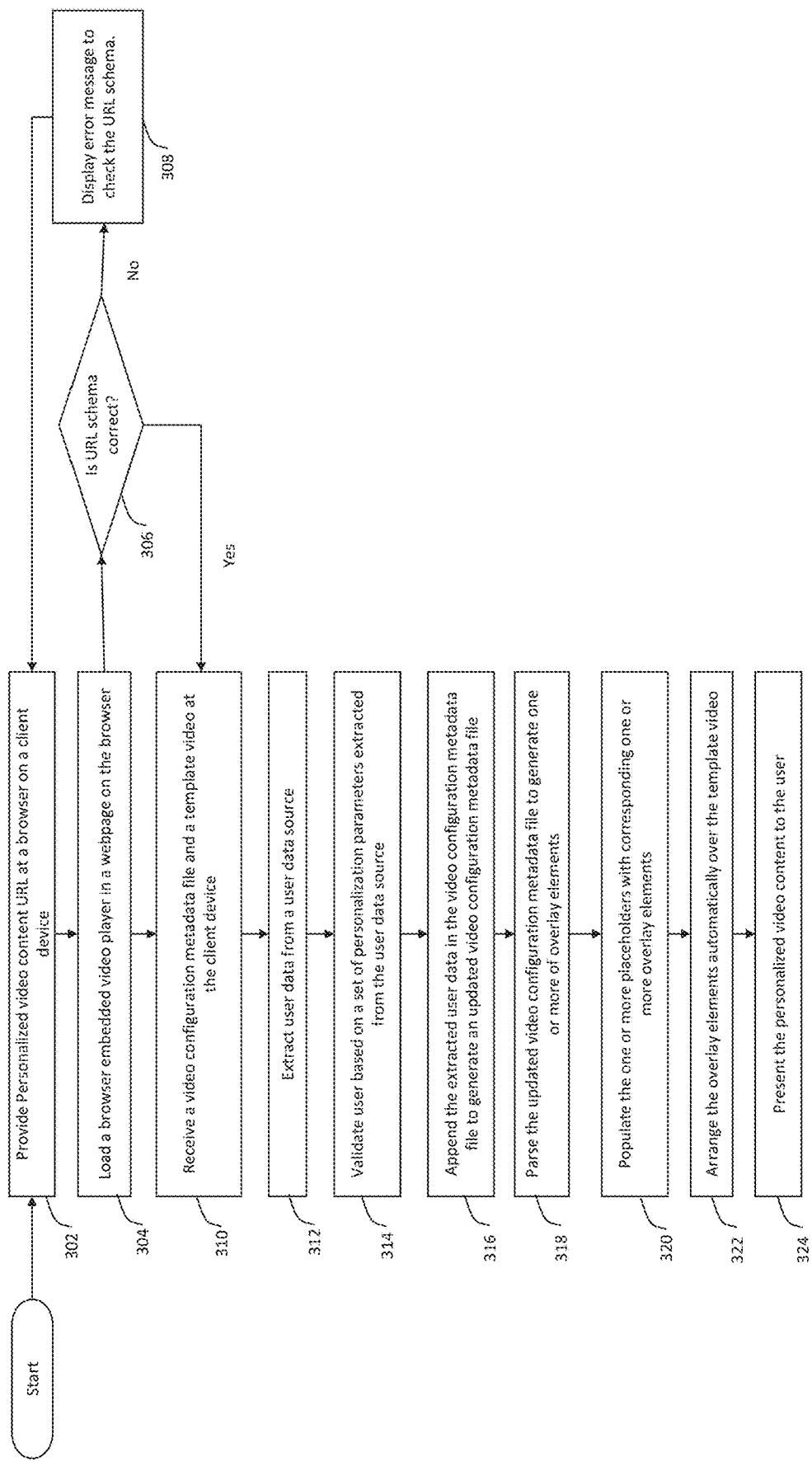

```
"captions": {
    "src": "captions/captions.vtt",
    "kind": "captions",
    "srclang": "en"
},
"overlays": [
    {
        "type": "text",
        "value": "Hello {userName}!",
        "class-name": "animated custom-fade-in-up",
        "start": 0.5,
        "end": 2.55,
        "style-properties": {
            ...
        }
    }
    ...
]
```

Video configuration metadata

FIG. 4(a)

```
{
    "userName": "Rachel",
    "contactInfo": "rachel@abc.com",
    "startDate": "20th Jan 2018",
    "endDate": "21st Apr 2018",
    "totalDue": "$240.58",
    "dueDate": "29 Jul 2018"
}
```

User data

FIG. 4(b)

SYSTEM AND METHOD FOR DYNAMIC GENERATION OF PERSONALIZED VIDEO CONTENT THROUGH A BROWSER EMBEDDED VIDEO PLAYER

This application claims the benefit of Indian Patent Application Serial No. 201941052391 filed Dec. 17, 2019, which is hereby incorporated by reference in its entirety.

FIELD

The present invention relates to a system, method and apparatus for generating a personalized video content. More specifically, it relates to dynamically creating a personalized video content for a user through a browser embedded video player.

BACKGROUND

Companies constantly look to provide distinctive experiences for their customers by not only providing important information, but also emphasizing the relevance of that information. Making every communication count is one of the key differentiators in the field of customer experience.

In an insurance company, for example, there are multiple communication channels through which an insurer interacts with the customer; from sending out flyers and prospects, to providing quotes, leads and statements. Often, the customer either fails to read the important information from these verbose documents, or has difficulty in understanding them. These communication gaps lead to disengaged customers, which in turn may lead to multiple customer service interactions, and subsequently, a dissatisfied customer, and lower conversion rates.

In the past few years, videos are replacing the plain, boring, textual content online. It is generally in the form of mass marketing content which is still less effective, as it lacks personalization. Customers still need to sift through information to understand what is relevant to them and what is not. Customers thus have begun to expect communication that is tailored to their needs, instead of mass marketing.

One of the approaches to deliver personalized video experience is by creating one video per person. In this approach, content management is cumbersome, as every unique personalized video generated for each user needs to be stored in a database and hosted on server. The content also needs to be optimized for delivery across multiple devices, and streamed thereof. This process is not very scalable. As the number of users increase so do the number of videos, management of those videos and delivery become cumbersome over the period. It is also extremely expensive, considering production costs, storage costs, delivery costs. The requirement of extensive setup for delivery of large volumes of videos make the process cumbersome. Also, producing the personalized content for each user can be expensive.

Thus, there is a need of providing an improved personalization method to overcome the disadvantages of the prior art.

SUMMARY

Disclosed are a system, method and apparatus for providing a personalized video viewing experience using web technologies.

In one aspect, a method for generating a personalized video content for a user is disclosed. The method further discloses the personalized video content creation at run time through a browser embedded video player. Further, receiving, a video configuration metadata file and a template video comprising one or more replaceable placeholders at a client device through a user interface and extracting, user data from at least one user data source by an extraction engine. Still further, validating, the user based on a set of personalization parameters extracted from the user data source by a user authenticator and appending, the extracted user data in the video configuration metadata file to generate an updated video configuration metadata file. Further, parsing, the updated video configuration metadata file to generate one or more of overlay elements and populating, the one or more placeholders with corresponding one or more overlay elements. Still further, automatically arranging the overlay element over the template video based on a set of predetermined rules and presenting the personalized video content to the user.

In another aspect of the invention, the video configuration metadata file comprises of customizable configuration parameters.

In yet another aspect, the template video is provided over a network or as an offline file stored on the client device.

In a further aspect, the template video is dynamically selected from a set of predefined template videos, based on the user data.

In one more aspect, the user data is collected from one or more of a network-generated information, a user geo-location and an encoded URL.

In an additional aspect, the updated video configuration metadata file comprises a set of user specific video configuration metadata parameters.

In another aspect, the personalized video content is dynamically rendered on the client device using the template video.

In yet another aspect, the personalized video content is temporarily stored in a memory at the client device.

In a further aspect, the personalized video content is displayed on the client device through a network interface.

In another aspect of the invention, a system to generate, a personalized video content at run time through a browser embedded video player is disclosed. The system includes a memory coupled to one or more processors which are configured to execute programmed instructions stored in the memory including receiving, at a client device through a user interface, a video configuration metadata file and a template video comprising one or more replaceable placeholders. Further, extracting, by an extraction engine, user data from at least one user data source and validating, by a user authenticator, the user based on a set of personalization parameters extracted from the user data source. Still further, appending the extracted user data in the video configuration metadata file to generate an updated video configuration metadata file. Further, parsing, by a parser, the updated video configuration metadata file to generate one or more of overlay elements and populating the one or more placeholders with corresponding one or more overlay elements. Still further, automatically arranging, the overlay element, by the template configurator, over the template video based on a set of predetermined rules and presenting, through the user interface, the personalized video content to the user.

In a further aspect, a computer program product comprising a non-transitory computer usable medium having a computer readable program code embodied therein for generating a personalized video content for a user is disclosed. The method further discloses the personalized video content creation at run time through a browser embedded video player. Further, receiving, a video configuration metadata file and a template video comprising one or more replaceable placeholders at a client device through a user interface and extracting, user data from at least one user data source by an extraction engine. Still further, validating, the user based on a set of personalization parameters extracted from the user data source by a user authenticator and appending, the extracted user data in the video configuration metadata file to generate an updated video configuration metadata file. Further, parsing, the updated video configuration metadata file to generate one or more of overlay elements and populating, the one or more placeholders with corresponding one or more overlay elements. Still further, automatically arranging the overlay element over the template video based on a set of predetermined rules and presenting the personalized video content to the user.

The methods, systems, and apparatuses disclosed herein may be implemented in any means for achieving various aspects, and may be executed in a form of a machine/readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3, is a flow diagram that illustrates an exemplary embodiment for a method for generating personalized video content for a user;

FIGS. 4(a) and 4(b), indicate exemplary representations of video configuration metadata and user data respectively;

Figure 1:
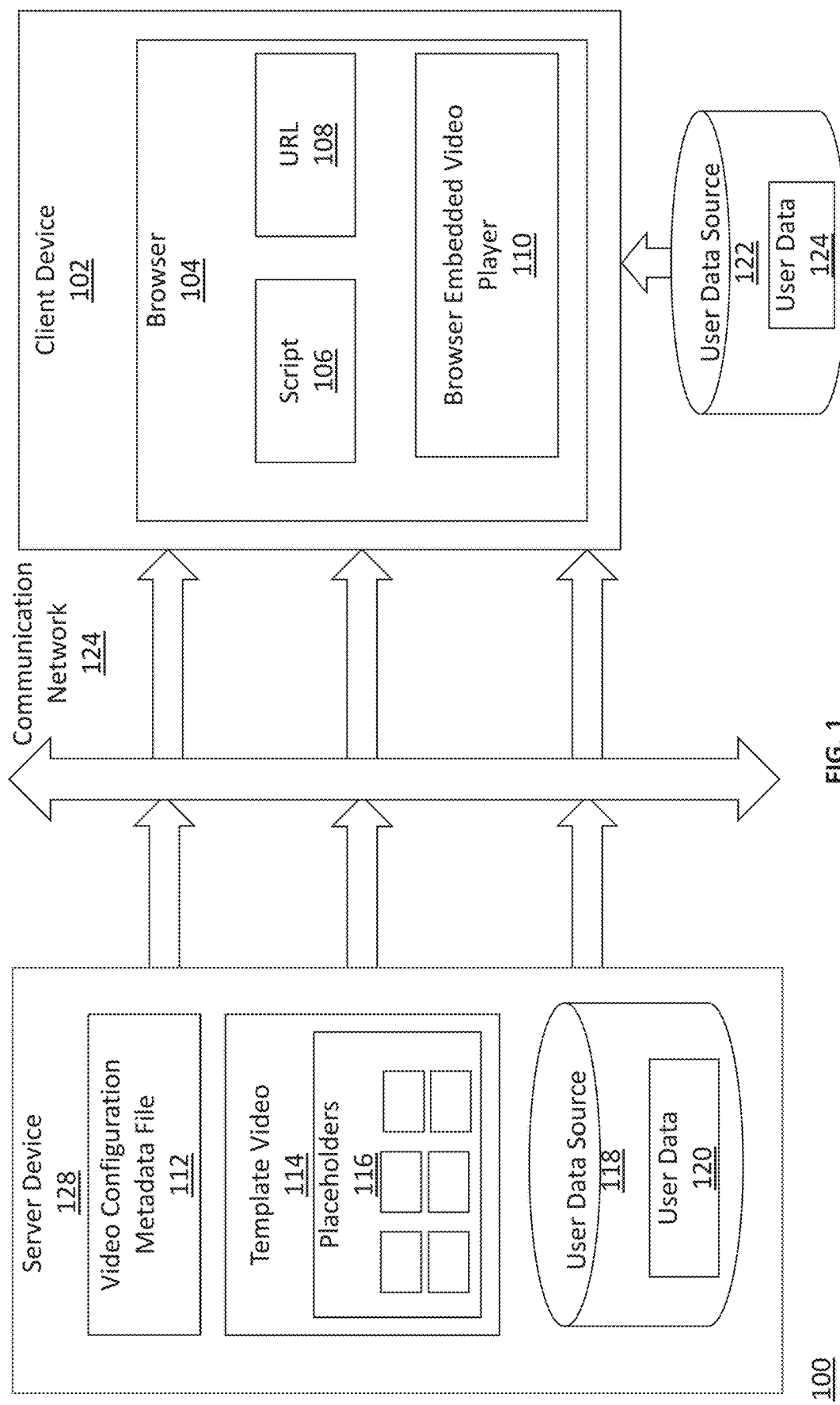
FIG. 1, is a schematic block diagram illustrating the structure of a system on which methods of the invention may be embodied.

Other features of the present embodiments will be apparent from the accompanying drawings and from the detailed description that follows.

DETAILED DESCRIPTION

Exemplifying embodiments, as described below, may be used to provide a method, an apparatus and/or a system for generating a personalized video content at run time for a user through a browser embedded video player.

Although the present embodiments have been described with reference to specific example embodiments, it will be evident that various modifications and changes may be made to these embodiments without departing from the broader spirit and scope of the various embodiments.

Blending the power of personalization with video may add unprecedented value in the area of client engagement, as people actively seek out relevant information across channels. This may not only help business manage the overall client relationship cycle, but also provide the opportunity to reduce the operational cost of client service. In the current state-of-the-art, various approaches may be followed for generating personalized video and broadcasting over network to a specific user or various users with common area of interest. This may cause the generated video content to be directed either to that specific user or large audience without considering the details of the requirement. These videos may be created on server which would require high processing power and huge storage space. Dynamic personalization elements, analytics and in-video interactive features are generally missing in the videos due to focus on bulk production.

Dynamic creation of a personalized video content for a specific user on a client device was absent. There was a requirement for enabling a platform for providing a personalized video content as per the requirements and understanding of a particular user in a real time approach. There was a further requirement of creating personalized videos using low processing power and without the requirement of storing the videos in a database.

In various embodiments of the present invention, the personalized video content may be created by consuming a video configuration metadata file, a template video and user data by a browser embedded video player on a client device.

In one of the embodiments of the present invention, the template video along with video configuration metadata file may be received at the client device to create a personalized video content as per the preference and profile of the user and the capabilities of the requesting user's client device.

In another embodiment of the present invention, user profile and preference information along with profile information of the client device to select the video configuration metadata file and template video that are relevant to the user and/or preferences as well as the capabilities of the client device may also be taken into account. The present system and method compiles the selected video configuration metadata file with selected template video along with user data that are relevant to the requested video content to generate and transmit a personalized video content to the user.

In another embodiment of the present invention, one way to generate personalized video in real time may include providing personalized video content URL at a browser on a client device, loading a browser embedded video player in a webpage on the browser, receiving a video configuration metadata file and a template video at the client device, extracting user data from a user data source, validating user based on a set of personalization parameters extracted from the user data source, appending the extracted user data in the video configuration metadata file to generate an updated video configuration metadata file, parsing the updated video configuration metadata file to generate one or more of overlay elements, populating the one or more placeholders with corresponding one or more overlay elements, arranging the overlay elements automatically over the template video and presenting the personalized video content to the user.

FIG. 1 illustrates a block diagram of an exemplary system 100 to generate personalized video content at a client device 102. This block diagram broadly illustrates how individual system elements may be implemented in a separated or more integrated manner. The system 100 includes the client device 102, a browser 104, script 106, URL 108, browser embedded video player 110, video configuration metadata file 112, template video 114, placeholders 116, user data sources 118, 122 and user data 120, 124. The client device can be connected to the server device 128 over the communication network 124. The template video 114 comprises placeholders 116 for insertion of user specific data. As used herein, a URL 108 or uniform resource locator may generally refer to any pointer or instruction to identify a location.

A client device 102 is the computing device that displays the personalized video content to a user. Example client devices 102 take on many forms, including but not limited to a personal computer (e.g., desktop or laptop), tablet computer, mobile device (e.g., personal digital assistant (PDA) or smart phone) and other computing device capable of having a browser. The client device 102 includes network-interface components to enable the user to connect to a communications network 124, such as the Internet. The client device 102 also includes digital content viewing and playback plug-ins or standalone software to enable the user to view both digital content (e.g., video and audio) and personalized video. The client device 102 comprises a browser 104 which further comprises a browser embedded video player 110, URL 108 for displaying personalized video content and script 106 used for creating the personalized video content. The browser embedded video player 110 may be configured to process data in HTML5 format, including natively decoding one or more video formats referenced by a HTML5 <video> tag. Client device 102 decodes the video and displays it in the browser.

Communication Network 124 comprises a publicly accessible network, such as the Internet, which enables communication between the client device 102 and the server device 128. However, it is contemplated that the communication network 124 may comprise other types of private and/or public networks. Communications between the client device 102 and the server device 128 preferably take place over the communication network 124 according to network protocols, such as the HTTP, UDP, and TCP/IP protocols and the like.

Further, it should be appreciated that the communication network 124 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

In one of the embodiments of the present invention, the browser 104 on the user device 102 sends a web page request to a web server which returns the web page in HTML5. The returned HTML5 page from the web server also includes a script 106 (JavaScript or like). The JavaScript implements a number of functions, such as instructs the browser 104 on how to process video configuration metadata file 112, template video 114 and user data 120, 124 in the browser embedded video player 110 to display a personalized video content at run-time.

In some embodiments of the present invention, the user data 120, 124 may be selected from a combination of one or more online or offline data sources, such as, for example, one or more web pages, files, RSS feeds, web services or databases, etc. The user data 120, 124 may even be encoded in URL 108 as query parameters or relative URLs 108 and sent to the client device 102.

In an aspect, the client device 102 may locally store the user data. In another aspect, the client device 102 may be configured for on-demand access to a remote server and/or storage device 118, 122 which stores the user data 120, 124.

In one of the embodiments, the user is given the opportunity to log into a webpage capable of displaying personalized video content using an assigned login and password or a retrieval code. If the user logs in, the sever device 128 validates the login and password of the user, by querying the user data source 118, 122. If the user is registered, the user data source 118, 122 sends back information associated with the user such as, for example, the user profile, preferences, etc., or one or more references to saved personalized videos. The browser embedded video player 110 generates and displays the personalized video content to the user. The personalized video content is not required to be saved in a database. The video will be created at run-time and displayed to the user without the requirement of saving it in any database.

In another embodiment, the user may select various options from a menu to edit personal information or preferences for generating personalized video. The edited personal information is saved in the user data source 120, 122.

In some embodiments of the present invention, the generic template video 114 includes a theme or story related to the topic of interest. Each template video may be designed differently, for example, to offer a particular style in the generation of a personalized video. A template video 114 may include a plurality of items, including for example, one or more placeholders 116, multimedia assets, e.g., visual and/or audio assets such as, for example, images, video clips, texts, animations, soundtracks, sound effects, narration, and may further include placeholders 116 that may be linked and populated with dynamic data objects, e.g., URL, path, database connection link, or any other reference provided by the user or selected from user data 120, 124.

In some embodiments of the invention, a populated template may be represented by a JSON file whose placeholder tags are completely or partially replaced with data selected from the user data source 118, 122 and embedded. The replacement method may parse a user data source, such as a webpage, and replace the placeholders 116 in the template video 114 with data from the webpage. Thus, for example, an image placeholder may be replaced with an image file extracted from the webpage, a title placeholder may be replaced with an associated text title extracted from the webpage, etc.

Browser embedded video player 110 may use the template video 114 to perform selection of dynamic data objects to produce the personalized video content. Rules and heuristic methods may be applied to determine how to associate the dynamic input data with the placeholders 116. The rules and categories for selection and generation of personalized video may include, for example: (a) selection of a template video 114 from a set of available previously prepared template videos 114 of desired style, such as for example, car insurance, or medical bills, or inventory data or other template videos 114; (b) determination of position of the selected dynamic data objects in the generated personalized video; (c) animation effects to be used on dynamic objects, e.g., panning, zooming, etc. on a selected image; (d) selection of a soundtrack; (e) presentation of text data, e.g. details pertaining to the car, its insurance value, time remaining for lapse of insurance, etc.

In one embodiment, a server device 128 may generate video configuration metadata file 112 using any text editing software or personalized smart video studio application. Video configuration meta data file 112 may contain timing, styling, positioning, animation information of annotations to be shown in the video. A URL 108 embedded with user data 120 is sent to the browser 104 by the server device 128. The user data is validated and the browser 104 further retrieves the video template 114 and video configuration metadata file 112 and passes them to the browser embedded video player 110. Video configuration meta data file 112 may be appended with the user data and parsed to generate one or more overlay elements. Placeholders 116 are populated with one or more overlay elements. The overlay elements are automatically arranged over the template video based on various rules and heuristic methods. The personalized video is generated by the browser embedded video player 110.

In another embodiment of the present invention, a user authenticator may recognize the user and transfer the collected information to the server device 128. The collected user data may be analyzed at the server device 128 where template video 114 may be chosen and sent to the client device 102 over the communication network 124. The browser embedded video player 110 may integrate user data 120, 124, template video 114 and video configuration metadata 112 to generate a personalized video with most appropriate content for the user 104.

In some examples, the request sent from the client device 102 can include authentication data associated with the user and in other examples, the authentication data can be received before or after the request for the personalized video content. The authentication data can comprise a username, password, personal identification number (PIN), digital certificate, pass code, or other similar credentials used to identify the user. A preferred embodiment, although not required, would incorporate two or more of the authentication data types in combination to identify the user.

In another embodiment, in case the user is not recognized a generic template video may be provided at the client device to generate a non-personalized video.

The User data source 118, 122 holds personalized information related to the user of the client device 102. When the server device 128 receives a request for personalized video content from the client device 102, the server device 128 can retrieve information from the user data source 118, 122 pertaining to that user. Although two user data source 118, 122 are shown, there can be multiple data sources in the system 100. In some examples, the user data source 118 can be a data feed received from various commercial entities which collect and make the requisite data available for retrieval. In still other examples, the user data source 122 is a client device hosting database applications.

In determining what types of personalized information to retrieve from the user data source 118, 122, the server device 128 can determine if the user has specified any personalized information preferences. In some examples, the preferences can be specified in the request received from the client device 102, or the preferences can be part of a user profile stored in user data source 118, 122 and retrieved by the server device 128 when a video content request is received from a particular user. For example, the user could specify as a preference that he always wants to see his current bank account balance when he requests any video content. Thereafter, when server device 128 receives a video content request from that user, the server device 128 can transmit the relevant template video 114 and the user data 118, 124 containing the preference and send the information to browser embedded video player 110 for generating the personalized video content.

In some examples, the user data 120, 124 can include various types of information related to the user (e.g., demographics, finances, interests, etc.) and associated with a specific entity (e.g. Car Insurance, Water Bill Statement). The entity can be the same entity that distributes the video data. For example, the user can hold a Health Insurance account, and the user data 120, 124 can contain information regarding the account. In other examples, the user data 120, 124 can include information from third-party sources such as, for example, credit card companies, banks, social networking websites, email services, etc. The user data 120, 124 can include information entered by the user and information retrieved from internal and/or external user data sources 118, 122. The user profile can be configurable by the user via a network application (e.g., a web page). The user can log in and update his user data 120, 124 associated with delivery of personalized video content.

In one embodiment, the browser embedded video player 110 is configured to allow a user to select content within the personalized video content. This allows the user to identify and select the items. For example, a user may be viewing a personalized video content containing a new car. The personalized video content is then displayed with the new car. As the user positions a selection tool near the new car in the video, the car is highlighted for user selection, e.g., to associate the car as a call-to-action. In other embodiments, portions of the video objects are selectable. For example, in the above car example, the user may mouse over a phone icon in the personalized video and the call option would then be highlighted in order for the user to call a customer service agent.

In other embodiments, the personalized video content is segmented such that a user is provided the ability to select one or more objects in the video. In other embodiments, the user interface provides a dynamic message such as a "call to action" to a user. The call to action may be timed with the video and/or with the user viewing selections in order to urge a user to take a pre-determined action such as call customer care, purchase a product, make a donation, and the like.

Figure 2:
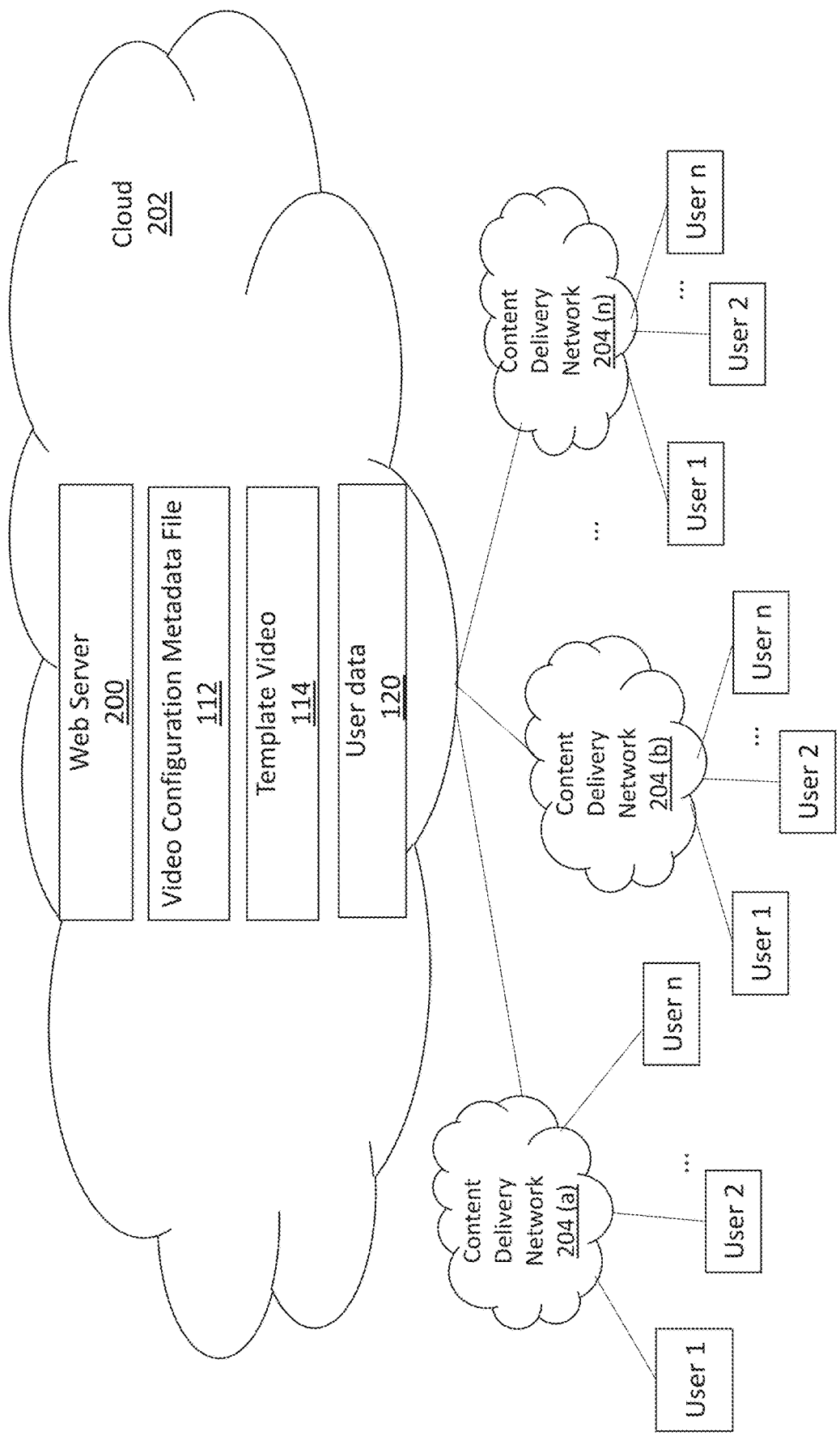
FIG. 2, is a block diagram of an exemplary system to generate personalized video content for users.

FIG. 2 is an exemplary diagrammatic representation for generating personalized video content for various users (User 1, User 2, . . . User n). This diagram broadly illustrates how individual system elements may be implemented in a separated or more integrated manner. The system includes a web server 200, video configuration metadata file 112, template video 114 and user data 120, 124 in a cloud 202 infrastructure, various users (User 1, User 2, . . . User n) connected to the cloud 202 via content delivery network 204 (a), 204 (b) . . . 204 (n). The User (User 1, User 2, . . . User n) sends a request to view a personalized video content over a content delivery network 204 (a), 204 (b) . . . 204 (n) to the web server 200. Web server 200 sends URL and script comprising video configuration metadata file 112, template video 114 and user data 120, 124 to the client device to create a personalized video content using the browser embedded video player to be displayed to the user (User 1, User 2, . . . User n).

FIG. 3 illustrates a process flow for a method for generating personalized video content for a user. One way to generate personalized video in real time may include providing personalized video content URL at a browser on a client device 302, loading a browser embedded video player in a webpage on the browser 304, checking the URL schema 306, displaying error message 308, receiving a video configuration metadata file and a template video at the client device 310, extracting user data from a user data source 312, validating user based on a set of personalization parameters extracted from the user data source 314, appending the extracted user data in the video configuration metadata file to generate an updated video configuration metadata file 316, parsing the updated video configuration metadata file to generate one or more of overlay elements 318, populating the one or more placeholders with corresponding one or more overlay elements 320, arranging the overlay elements automatically over the template video 322 and presenting the personalized video content to the user 324.

FIG. 4 (a) indicates exemplary representation of video configuration metadata file with overlay elements. The video configuration meta data may consist of a list of personalization elements along with their properties such as user data reference, time of occurrence in the video, positioning them in the placeholder available on the template video and styling (color, size, animations, etc.). User data is extracted from a user data source which is further validated based on a set of personalization parameters extracted from the user data source. The extracted user data is appended in the video configuration metadata file to generate an updated video configuration metadata file. The method for generating the updated video configuration metadata file may include parsing the user data source, such as a JSON file, and replacing the user data in the video configuration metadata file with data from the webpage. Thus, for example, timing, styling, positioning, animation information of annotations may be replaced with the associated data extracted from the webpage. The updated video configuration metadata file is further parsed to generate one or more of overlay elements. Parsing dynamically creates overlay elements for various elements in the video configuration metadata e.g. data regarding font-size, color, text-align etc. In one embodiment, the parsing is done as a search and replace operation by a processor. FIG. 4 (b) indicates exemplary representation of user data comprising various specific information related to the user.

Figure 5:
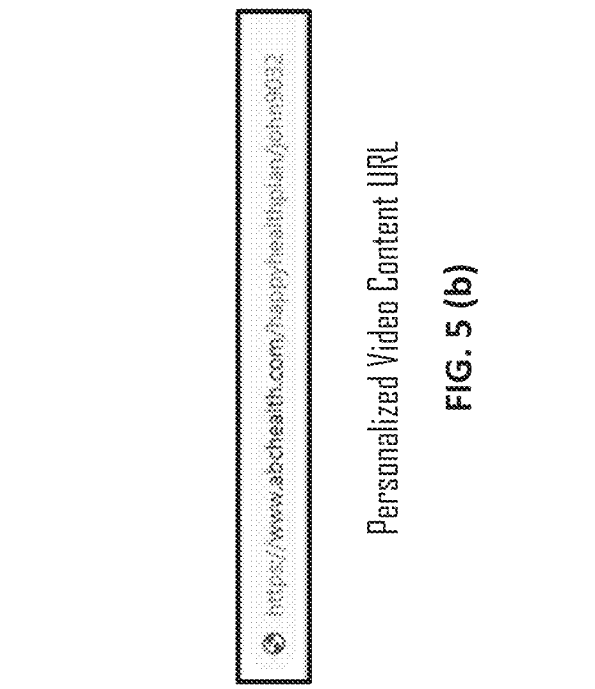
FIGS. 5(a) and 5(b), indicate exemplary screenshots of personalized video web interface and personalized video content URL respectively.
Figure 5:
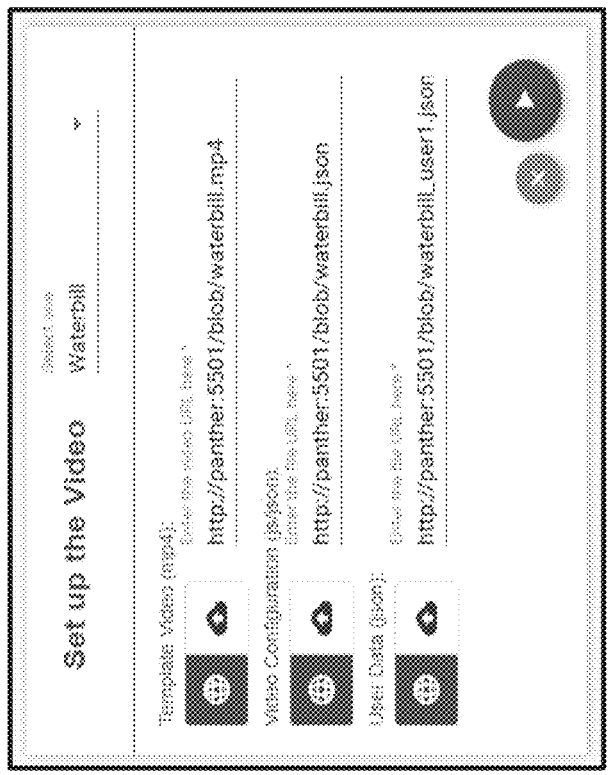

FIG. 5(a) indicates exemplary screenshot of personalized video web interface. The web interface demonstrates that template video, video configuration metadata file and user data may be used by the browser embedded video player to generate personalized video. FIG. 5(b), indicate exemplary screenshot of personalized video content URL encoded with user data. The user data may be encoded in URL as query parameters or relative URLs and sent to the client device.

Figure 6:
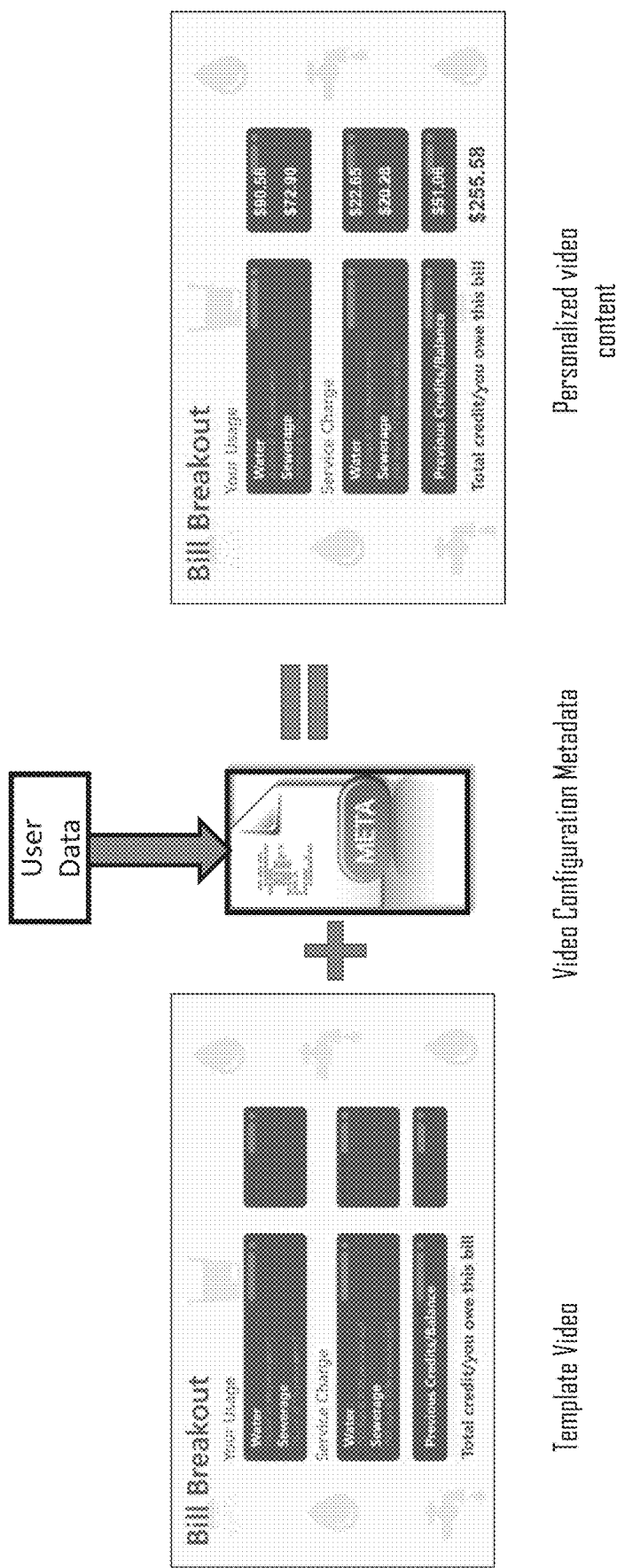
FIG. 6, is an exemplary representation for generating personalized video content.

FIG. 6, is an exemplary representation for generating personalized video content. The system compiles the video configuration metadata file with template video along with user data that are relevant to the requested video content to generate and transmit a personalized video content to the user.

Figure 7:
FIG. 7, is an exemplary representation of a browser embedded video player.

FIG. 7, is an exemplary representation of a browser embedded video player which generates and presents the personalized video content. The browser embedded video player can be a customized software application designed for generating the personalized video content. The browser embedded video player includes a video content display area, and playback controls such as a play/pause button, a scrubber bar, a volume control, and a time indicator. The browser embedded video player also includes pop-in window area and a fly-out window area, preferably hidden from view when the video content playback begins. A pop-up window that is separate from the browser embedded video player can also be included. The pop-in window, fly-out window, and/or the pop-up window can be used to display the personalized information.

In one of the embodiments of the present invention, the user data may be provided by the user, by a third party, stored in the user data source or gathered from a profile (for example from a database or from another source). The user data may be provided using a form where the user answers questions by selecting an answer in the form of a text, a video, an audio and/or image from a list, providing a text, a video, an audio and/or an image, or a combination thereof. Alternatively, some or all of the answers to the questions of the form may be selected and/or information provided using a voice recognition sub-process. Furthermore, audio provided using the recognition sub-process may be further processed so as to modify the voice of the user to correspond to a desired voice for the personalized video content.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, firmware, or other type of processor-executable instructions, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer implemented method for generating a personalized video content at run time, through a browser embedded video player, the method comprising:
   receiving a video configuration metadata file and a template video comprising one or more replaceable placeholders at a client device;
   extracting user data from at least one user data source;
   validating the user data based on a set of personalization parameters extracted from the user data source;

appending the extracted user data in the video configuration metadata file to generate an updated video configuration metadata file;

parsing the updated video configuration metadata file to generate one or more of overlay elements;

populating the one or more placeholders with corresponding one or more overlay elements;

automatically arranging the one or more overlay elements over the template video based on a set of predetermined rules; and presenting personalized video content based on the automatically arranging.

2. The method of claim 1, wherein the video configuration metadata file comprises one or more customizable configuration parameters.

3. The method of claim 1, wherein the template video is provided over a network or as an offline file stored on the client device.

4. The method of claim 1, wherein the template video is dynamically selected from a set of predefined template videos, based on the user data.

5. The method of claim 1 wherein the user data is collected from one or more of a network-generated information, a user geo-location and an encoded URL.

6. The method of claim 1, wherein the updated video configuration metadata file comprises a set of user specific video configuration metadata parameters.

7. The method of claim 1, wherein the personalized video content is dynamically rendered on the client device using the template video.

8. The method of claim 7, wherein the personalized video content is temporarily stored in a memory at the client device.

9. The method of claim 1, wherein the personalized video content is displayed on the client device through a network interface.

10. A system to generate a personalized video content at run time, through a browser embedded video player, the system comprising;
  a processor; and
  a memory coupled to the processor configured to be capable of executing programmed instructions comprising and stored in the memory to:
    receive, at a client device through a user interface, a video configuration metadata file and a template video comprising one or more replaceable placeholders;
    extract, by an extraction engine, user data from at least one user data source;
    validate, by a user authenticator, the user data based on a set of personalization parameters extracted from the user data source;
    append the extracted user data in the video configuration metadata file to generate an updated video configuration metadata file;
    parse, by a parser, the updated video configuration metadata file to generate one or more of overlay elements;
    populate the one or more placeholders with corresponding one or more overlay elements;
    automatically arrange the one or more overlay elements, by the template configurator, over the template video based on a set of predetermined rules; and
    present, through the user interface, personalized video content based on the automatically arrange.

11. The system of claim 10, wherein the video configuration metadata file comprises of customizable configuration parameters.

12. The system of claim 10, wherein the template video is provided over a network or as an offline file stored on the client device.

13. The system of claim 10, wherein the template video is dynamically selected from a set of predefined template videos, based on user data.

14. The system of claim 10, wherein the user data is collected from one or more of a network-generated information, a user geo-location and an encoded URL.

15. The system of claim 10, wherein the updated video configuration metadata file comprises a set of user specific video configuration metadata parameters.

16. The system of claim 10, wherein the personalized video content is dynamically rendered on the client device using the template video.

17. The system of claim 16, wherein the personalized video content is temporarily stored in a memory at the client device.

18. The system of claim 10, wherein the personalized video content is displayed on the client device through a network interface.

19. A non-transitory machine readable medium having stored thereon instructions comprising executable code which when executed by one or more processors, causes the one or more processors to:
  receive a video configuration metadata file and a template video comprising one or more replaceable placeholders;
  append user data in the video configuration metadata file to generate an updated video configuration metadata file;
  parse the updated video configuration metadata file to generate one or more overlay elements;
  populate the one or more overlay elements with the one or more placeholders;
  automatically arrange the one or more overlay elements over the template video based on one or more predetermined rules; and
  present personalized video content comprising the arranged template video.

20. The medium as set forth in claim 19 further comprising executable code which when executed by a processor causes the processor to:
  extract the user data from at least one user data source; and
  validate the user data based on a set of personalization parameters extracted from the user data source.

* * * * *